(12) United States Patent
Misawa

(10) Patent No.: US 10,477,036 B2
(45) Date of Patent: Nov. 12, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Reiji Misawa, Kashiwa (JP)

(73) Assignee: Canon Kabushiki Kaisha, Tokyo (JP)

(\*) Notice: Subject to any disclaimer, the term of this patent is extended or adjusted under 35 U.S.C. 154(b) by 235 days.

(21) Appl. No.: 15/484,966

(22) Filed: Apr. 11, 2017

(65) Prior Publication Data

US 2017/0302803 A1    Oct. 19, 2017

(30) Foreign Application Priority Data

Apr. 14, 2016  (JP) ................................ 2016-081486
Jan. 31, 2017  (JP) ................................ 2017-016097

(51) Int. Cl.
| | |
|---|---|
| *G06K 9/00* | (2006.01) |
| *H04N 1/00* | (2006.01) |
| *G06T 7/90* | (2017.01) |
| *G06T 7/40* | (2017.01) |
| *H04N 1/60* | (2006.01) |

(52) U.S. Cl.
CPC .......... *H04N 1/00034* (2013.01); *G06T 7/40* (2013.01); *G06T 7/90* (2017.01); *H04N 1/00005* (2013.01); *H04N 1/00023* (2013.01); *H04N 1/00082* (2013.01); *H04N 1/6027* (2013.01); *H04N 1/6097* (2013.01); *G06T 2207/10024* (2013.01); *H04N 2201/0094* (2013.01)

(58) Field of Classification Search
None
See application file for complete search history.

(56) References Cited

U.S. PATENT DOCUMENTS 4,642,683 A * 2/1987 Alkofer ................ H04N 1/6027
355/38
5,764,792 A * 6/1998 Kennealy ........... G06K 9/00127
250/462.1

(Continued)

FOREIGN PATENT DOCUMENTS

| CN | 101556600 A | 10/2009 |
| CN | 102216956 A | 10/2011 |

(Continued)

OTHER PUBLICATIONS

Yang et al., "Can Infants Tell the Difference between Gold and Yellow?" PloS one vol. 8,6 e67535. Jun. 26, 2013, doi:10.1371/journal.pone.0067535 (Year: 2013).*

(Continued)

*Primary Examiner* — Feng Niu
(74) *Attorney, Agent, or Firm* — Canon U.S.A., Inc. IP Division

(57) ABSTRACT

An image processing apparatus includes a decomposition unit configured to decompose a color image into at least two color component images, a first obtaining unit configured to obtain a skewness of a histogram corresponding to each of the color component images, and a determination unit configured to determine based on the obtained skewnesses associated with the color component images whether the color image is glossy.

14 Claims, 16 Drawing Sheets

(56) References Cited

U.S. PATENT DOCUMENTS

| | | | | |
|---|---|---|---|---|
| 7,085,413 | B2* | 8/2006 | Huang | H04N 1/6077 |
| | | | | 382/163 |
| 7,761,240 | B2* | 7/2010 | Saidi | G06K 9/0014 |
| | | | | 382/128 |
| 8,237,986 | B2* | 8/2012 | Nakamura | H04N 1/484 |
| | | | | 358/1.9 |
| 8,345,317 | B2* | 1/2013 | Makino | G03G 15/5025 |
| | | | | 358/1.15 |
| 8,699,791 | B2* | 4/2014 | Muraishi | H04N 1/4074 |
| | | | | 382/163 |
| 9,049,477 | B2* | 6/2015 | Liu | H04N 5/44543 |
| 9,064,180 | B2* | 6/2015 | Korichi | A61B 5/0059 |
| 9,118,871 | B2* | 8/2015 | Kobayashi | H04N 1/54 |
| 9,457,952 | B2* | 10/2016 | Heatley | B65D 83/32 |
| 9,769,232 | B2* | 9/2017 | Liu | H04N 5/44543 |
| 10,043,120 | B2* | 8/2018 | Lee | G06T 7/90 |
| 2009/0219561 | A1* | 9/2009 | Kozuka | H04N 1/00846 |
| | | | | 358/1.14 |
| 2010/0265524 | A1* | 10/2010 | Muramatsu | H04N 1/32106 |
| | | | | 358/1.9 |
| 2011/0216967 | A1* | 9/2011 | Hagiwara | H04N 1/62 |
| | | | | 382/162 |
| 2011/0281032 | A1* | 11/2011 | Kagata | C09D 11/322 |
| | | | | 427/256 |
| 2013/0010094 | A1* | 1/2013 | Satish | G06K 9/00 |
| | | | | 348/77 |
| 2014/0043629 | A1 | 2/2014 | Shirado | |
| 2014/0064558 | A1* | 3/2014 | Huang | G06T 7/248 |
| | | | | 382/103 |
| 2014/0233826 | A1* | 8/2014 | Agaian | G16H 50/30 |
| | | | | 382/133 |
| 2015/0248221 | A1* | 9/2015 | Sasaki | G06F 3/04845 |
| | | | | 345/173 |
| 2017/0193735 | A1* | 7/2017 | Mandava | G07F 17/3204 |

FOREIGN PATENT DOCUMENTS

| | | | |
|---|---|---|---|
| JP | 2009063694 A | | 3/2009 |
| JP | 2012168860 A | * | 9/2012 |
| JP | 6244315 B2 | * | 12/2017 |

OTHER PUBLICATIONS

Kam et al., "Human visual cortical responses to specular and matte motion flows" Frontiers in human neuroscience vol. 9 579. Oct. 21, 2015, doi:10.3389/fnhum.2015.00579 (Year: 2015).*

Chadwick et al., "The perception of gloss: a review." Vision research 109 (2015): 221-235. (Year: 2015).*

Anderson et al., (2009). Image statistics do not explain the perception of gloss and lightness. Journal of Vision, 9(11). (Year: 2009).*

Fleming, R. W. (2014). Visual perception of materials and their properties. Vision Research, 94, 62-75. http://dx.doi.org/10.1016/j.visres.2013.11.004. (Year: 2014).*

Sun et al., "Look but don't touch: Visual cues to surface structure drive somatosensory cortex." Neuroimage 128 (2016): 353-361. (Year: 2016).*

Cho, "Spatio-temporal integration of an object's surface information in mid-level vision", Ph.D. thesis, 2015. Retrieved from the University of Minnesota Digital Conservancy, http://hdl.handle.net/11299/175397. (Year: 2015).*

Isamu Motoyoshi, et al., Image Statistics and the Perception of Surface Qualities, Nature, May 10, 2007, pp. 206-209, vol. 447, Nature Publishing Group.

* cited by examiner

FIG. 10A

| CHANNEL | SKEWNESS |
|---|---|
| Y | −0.8 |
| R | −1.8 |
| G | −0.7 |
| B | 2.1 |

FIG. 10B

| CHANNEL | SKEWNESS |
|---|---|
| Y | −1.3 |
| R | −2.1 |
| G | −1.2 |
| B | −0.2 |

FIG. 10C

| CHANNEL | SKEWNESS |
|---|---|
| Y | −0.6 |
| R | −1.6 |
| G | −0.5 |
| B | 1.6 |

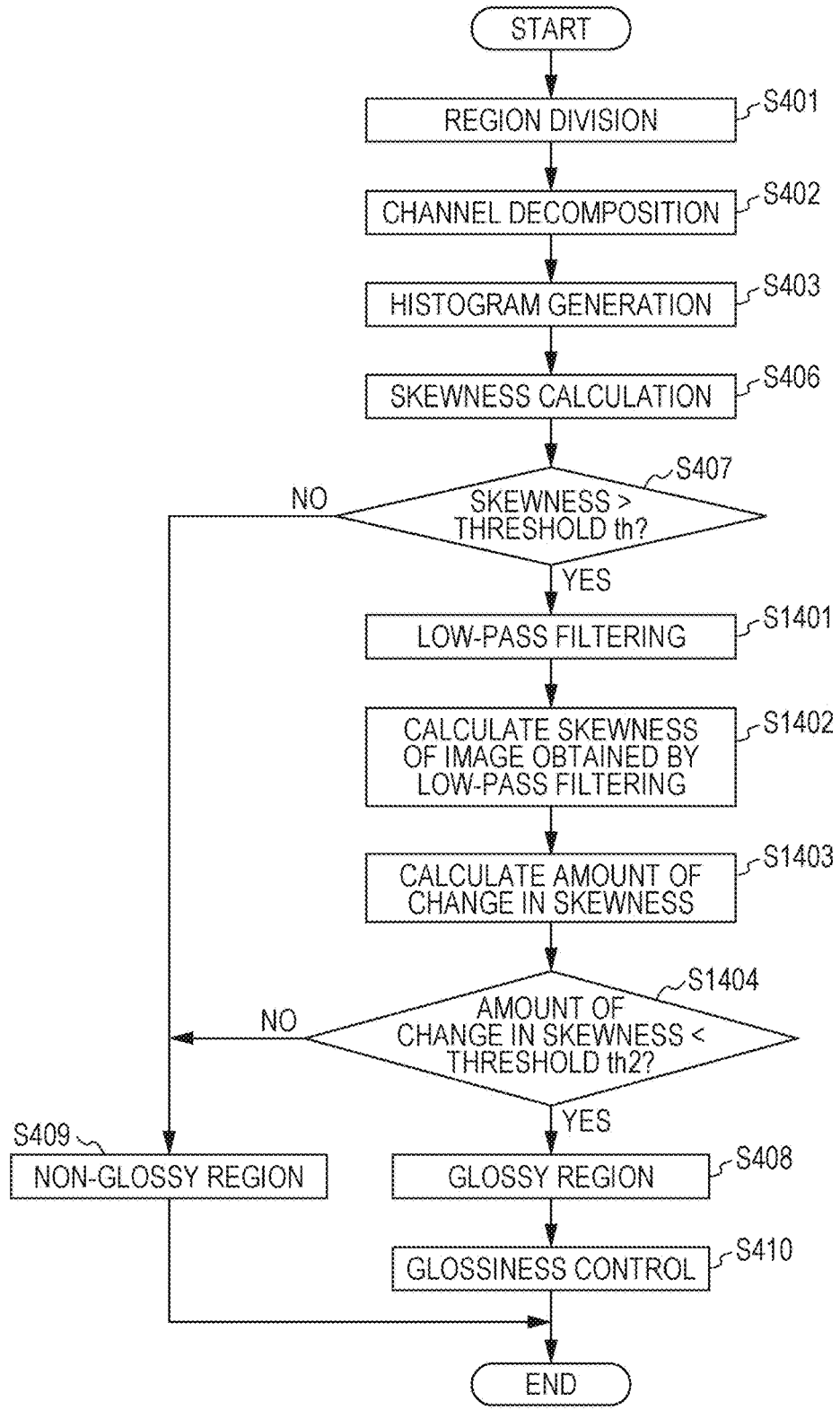

FIG. 16

| 1 | 1 | 1 |
|---|---|---|
| 1 | 1 | 1 |
| 1 | 1 | 1 |

IMAGE PROCESSING APPARATUS, IMAGE PROCESSING METHOD, AND STORAGE MEDIUM

BACKGROUND

Field

The present disclosure relates to an image processing apparatus, method, and a storage medium for determining whether an image is glossy.

Description of the Related Art

Various methods have recently been developed to detect the texture of a surface of an object (for example, a transparent appearance, a glossy appearance, or a metallic appearance), and display the detected texture. For example, Japanese Patent Laid-Open No. 2009-63694 discloses a technique for controlling display of an image corresponding to an image signal in an image display apparatus including a backlight. This technique involves determining whether an image includes a glossy portion and controlling display of the image having a glossy appearance without reducing the luminance of the entire image. To determine whether an image includes a glossy portion, this technique employs a method of calculating glossiness using the skewness of a luminance histogram. The method is described in "Image statistics and the perception of surface qualities", Nature, 447, 206-209, 2007.

As described in "Image statistics and the perception of surface qualities", Nature, 447, 206-209, 2007, a psychophysical experiment revealed that physical glossiness and lightness and the skewness of the luminance histogram are highly correlated with perceived glossiness and lightness.

This correlation indicates that, for example, as an image represents a glossier surface, a luminance histogram of the image is more positively skewed (or the frequencies of appearance of pixels gently spread to higher luminance values). The surface glossiness of the image can therefore be evaluated based on the skewness of the luminance histogram.

Images printed by image processing apparatuses, such as a multifunction peripheral (MFP) and a printer, are required to represent texture (glossy appearance) as well as colors and gradation.

In some cases, a color image input to an MFP or a printer may be subjected to glossiness determination based simply on the above-described skewness of a luminance histogram. In this case, the luminance histogram of a color image that seems to be actually glossy (mainly glossy yellow or orange in color) is negatively skewed, that is, the luminance histogram has a negative skewness. Unfortunately, whether the color image includes a glossy portion may not be properly determined.

The reason will now be described.

The luminance histogram is typically regarded as a histogram of the luminance Y defined by Equation (1) below in the YUV color space. For example, yellow and orange are the complementary colors of blue (B). The lower the proportion of B, the lower the proportion of these colors represented in the luminance histogram.

$$Y = 0.299 \times R + 0.587 \times G + 0.114 \times B \quad (1)$$

As will be understood from Equation (1), the B component having a small coefficient does not tend to be reflected in luminance conversion. As described above, information about the B component may be lost in the luminance histogram defined by Equation (1). Unfortunately, a determination based on the skewness of a luminance histogram as to whether an image includes a glossy portion may fail to be properly performed.

SUMMARY

Various embodiments of the present disclosure provide an image processing apparatus including a decomposition unit configured to decompose a color image into at least two color component images, a first obtaining unit configured to obtain a skewness of a histogram corresponding to each of the color component images, and a determination unit configured to determine based on the obtained skewnesses associated with the color component images whether the color image is glossy.

Further features will become apparent from the following description of exemplary embodiments with reference to the attached drawings.

BRIEF DESCRIPTION OF THE DRAWINGS

FIGS. 10A to 10C are tables illustrating skewnesses for individual channels according to the first embodiment.

FIG. 14 is a flowchart according to a third embodiment.

FIG. 16 is a diagram illustrating an example of a low-pass filter according to one embodiment.

DESCRIPTION OF THE EMBODIMENTS

Various embodiments of the present disclosure will be described with reference to the drawings.

First Embodiment

Figure 1:
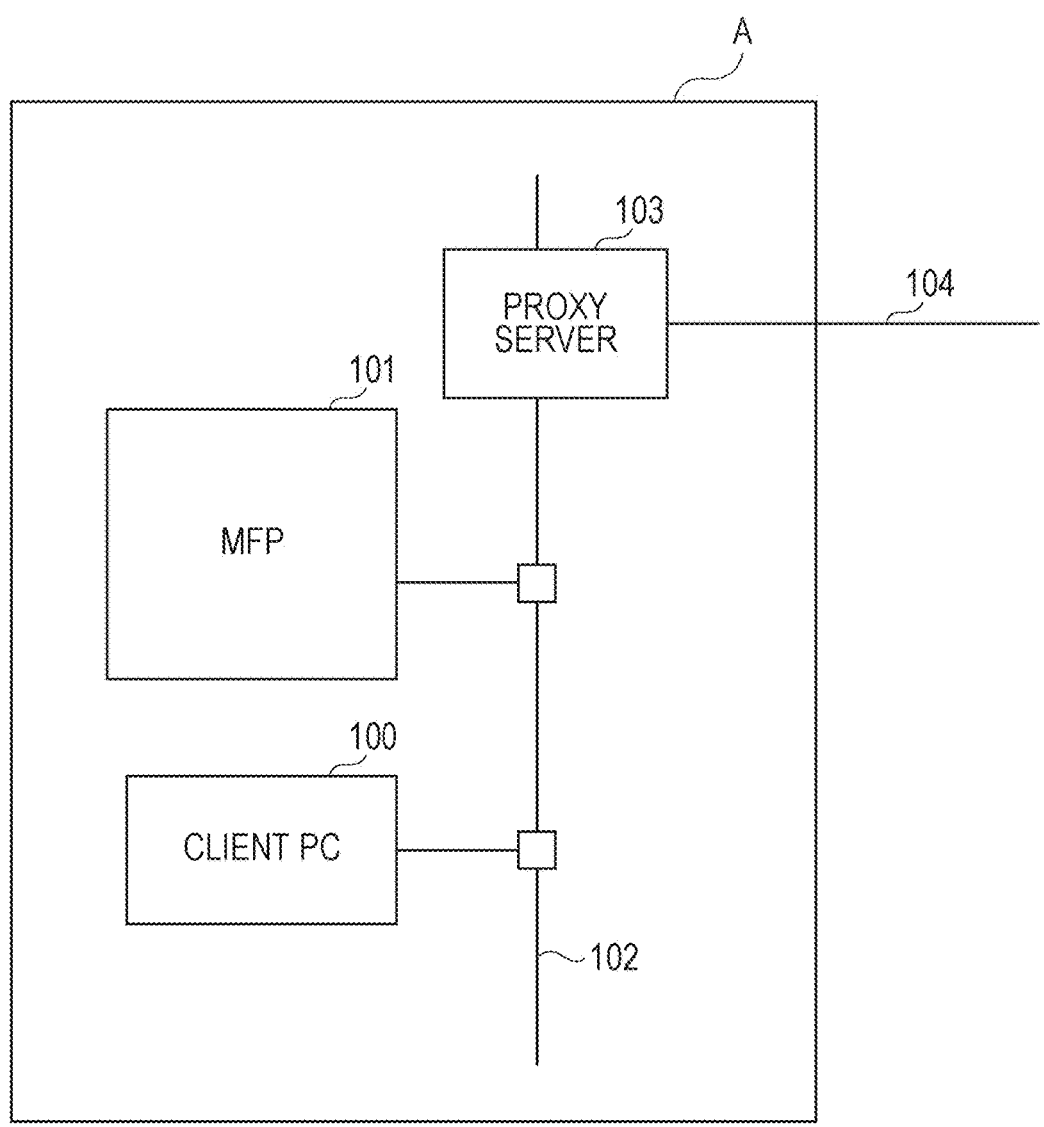
FIG. 1 is a block diagram of an image processing system according to one embodiment.

Referring to FIG. 1, an MFP 101 having a plurality of functions, for example, a copying function, a printing function, and a transmitting function, is connected to a local area network (LAN) 102 in an office A. The LAN 102 is connected to an external network 104 through a proxy server 103. A client personal computer (PC) 100 receives data transmitted from the MFP 101 and uses the functions of the MFP 101 over the LAN 102. For example, the client PC 100 can transmit print data to the MFP 101, causing the MFP 101 to provide a printed product based on the print data. FIG. 1 illustrates an exemplary configuration of an image processing system. A plurality of offices including the same components as those of the office A may be connected to the external network 104. The external network 104 is a communication network typically implemented by, for example, the Internet, a LAN, a wide area network (WAN), a telephone line, a dedicated digital line, an asynchronous transfer mode (ATM) line, a frame relay line, a communication satellite line, a cable television line, or a data broadcasting wireless line. Any communication network that enables data transmission and reception may be used. The client PC 100 and the proxy server 103 each include standard components of a general-purpose computer, for example, a central processing unit (CPU), a random access memory (RAM), a read-only memory (ROM), a hard disk, an external storage apparatus, a network interface, a display, a keyboard, and a mouse, which are not illustrated.

Figure 2:
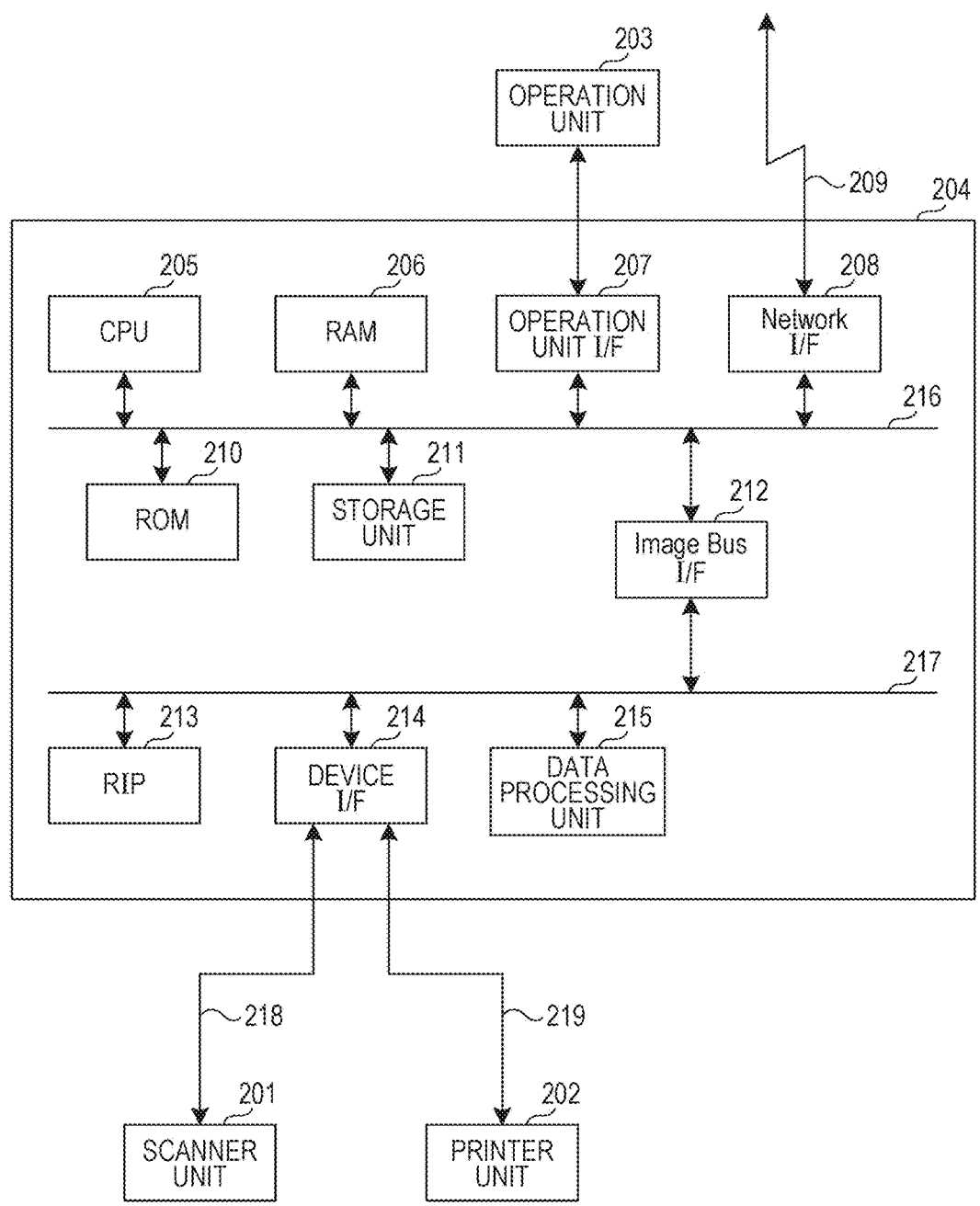
FIG. 2 is a diagram illustrating an exemplary configuration of an MFP according to one embodiment.

FIG. 2 illustrates a detailed configuration of the MFP 101. The MFP 101 includes a scanner unit 201 that serves as an image input device, a printer unit 202 that serves as an image output device, a control unit 204 that controls the entire MFP, and an operation unit 203 that serves as a user interface. The control unit 204 is a controller connected to the scanner unit 201, the printer unit 202, the operation unit 203, and a LAN 209 for input and output of image information and device information. A CPU 205 is a processor that controls the entire system. A RAM 206 is a system work memory for operation of the CPU 205 and also functions as an image memory for temporarily storing image data. A ROM 210 is a boot ROM in which programs, such as a boot program of the system, are stored. A storage unit 211 is a nonvolatile storage medium, such as a hard disk, in which system control software and image data are stored. An operation unit interface (I/F) 207 serves as an I/F unit for the operation unit (UI) 203 and outputs image data, which is to be displayed on the operation unit 203, to the operation unit 203. The operation unit I/F 207 plays a role in transmitting information, designated through the operation unit 203 by a user of the MFP (image processing apparatus) 110, to the CPU 205. A network I/F 208 connects the image processing apparatus to the LAN 209 to input and output data (e.g., to transmit and receive binary image data to and from another apparatus). The CPU 205, the RAM 206, the operation unit I/F 207, the network I/F 208, the ROM 210, and the storage unit 211 are connected by a system bus 216. An image bus I/F 212 is a bus bridge that connects the system bus 216 to an image bus 217, through which image data is transferred at high speed, and converts a data structure. Examples of the image bus 217 include a peripheral component interconnect (PCI) bus and an IEEE 1394 bus. The image bus 217 connects a raster image processor (RIP) 213, a device I/F 214, and a data processing unit 215. The RIP 213 performs a rendering process that involves analyzing a page description language (PDL) code and converting data into a bit map image with a designated resolution. The device I/F 214 is connected to the scanner unit 201, serving as an image input device, through a signal line 218 and is connected to the printer unit 202, serving as an image output device, through a signal line 219. The device I/F 214 converts image data synchronously or asynchronously. The data processing unit 215 performs glossiness determination and glossiness control on image data. The data processing unit 215 can decompress compressed image data received through the network I/F 208 and the LAN 209. The decompressed image data is transmitted to the printer unit 202 through the device I/F 214 and an image based on the data is printed. The data processing unit 215 will be described in detail below.

Description of Data Processing Unit 215

Figure 3:
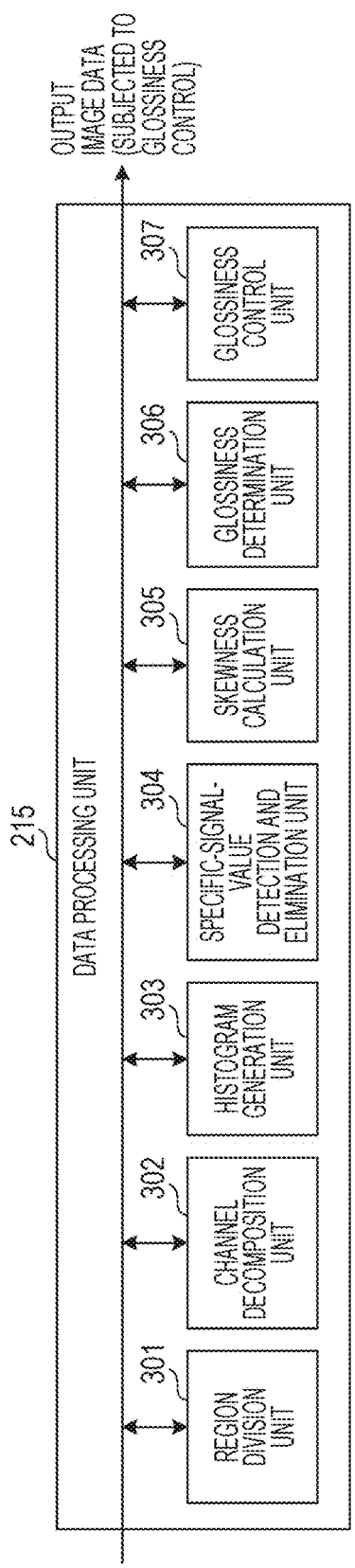
FIG. 3 is a block diagram of a data processing unit according to a first embodiment.

A glossiness determination unit and a glossiness control unit achieved by the data processing unit 215 in FIG. 2 will now be described with reference to a block diagram of FIG. 3. The data processing unit 215 may be configured to function as the units illustrated in FIG. 3 by executing a computer program through one or more processors. In the alternative, some or all of the units in FIG. 3 may be configured by hardware, such as an application specific integrated circuit (ASIC) or an electronic circuit.

Figure 11:
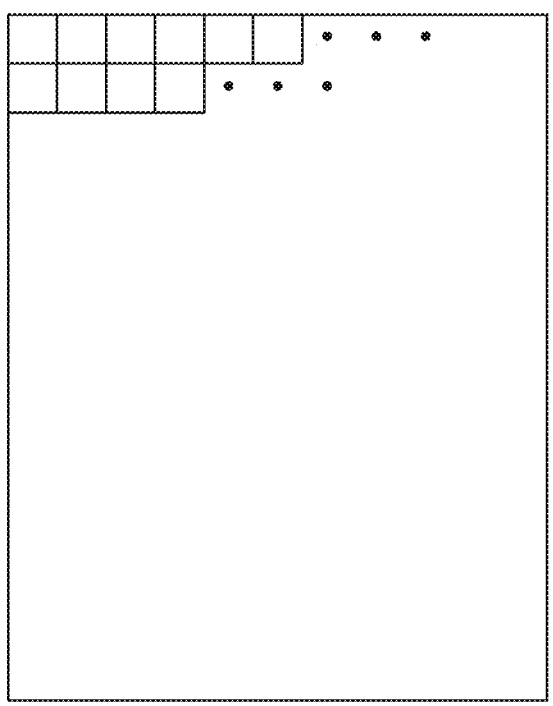
FIG. 11 is a diagram explaining region division according to the first embodiment.

A region division unit 301 performs a process of dividing input color image data into rectangular unit regions or regions having arbitrary shapes. FIG. 11 illustrates an example of division into rectangular unit regions.

A channel decomposition unit 302 performs channel decomposition on each of the regions of the color image data divided by the region division unit 301. For channel decomposition, each of the regions of the color image data is decomposed into three color components, or R, G, and B components in the present embodiment. In some embodiments, each region may be decomposed into color components of, for example, the LAB or YUV color space.

A histogram generation unit 303 generates a histogram for each of the channels obtained by channel decomposition through the channel decomposition unit 302. The term "histogram" as used herein refers to a frequency distribution in which the horizontal axis represents an image signal value and the vertical axis represents a frequency of appearance of the signal value.

A specific-signal-value detection and elimination unit 304 detects a specific signal value (mainly, a signal value representing a background image) in each histogram generated by the histogram generation unit 303 and eliminates the signal value from the histogram.

A skewness calculation unit 305 calculates a skewness for each of the channels from the corresponding one of the histograms processed by the specific-signal-value detection and elimination unit 304. The skewness can be given by using a general equation like Equation (2):

$$\text{skewness} = \Sigma(Xi - Xave)^3 / N \times S^3 \tag{2}$$

where N denotes the number of data items, Xi denotes the value of data, Xave denotes the arithmetic mean, and S denotes the standard deviation.

The skewness represents the extent to which the graph is skewed. When the skewness is a positive value greater than zero, the graph is skewed left. When the skewness is a negative value less than zero, the graph is skewed right. When the graph is not skewed, the graph represents a normal distribution.

When the skewness of a histogram of an image is a positive value, the image is determined to be glossy. When the skewness of the histogram of the image is a negative value, the image is determined not to be glossy.

A glossiness determination unit 306 determines based on the skewnesses calculated by the skewness calculation unit 305 whether a target region of the image data is a glossy region or a non-glossy region.

A glossiness control unit 307 performs glossiness control on a region determined to be a glossy region by the glossiness determination unit 306. Examples of glossiness control in MFPs and printers include density control and transparent toner addition control. Any other method that can provide a glossy appearance may be used.

Figure 4:
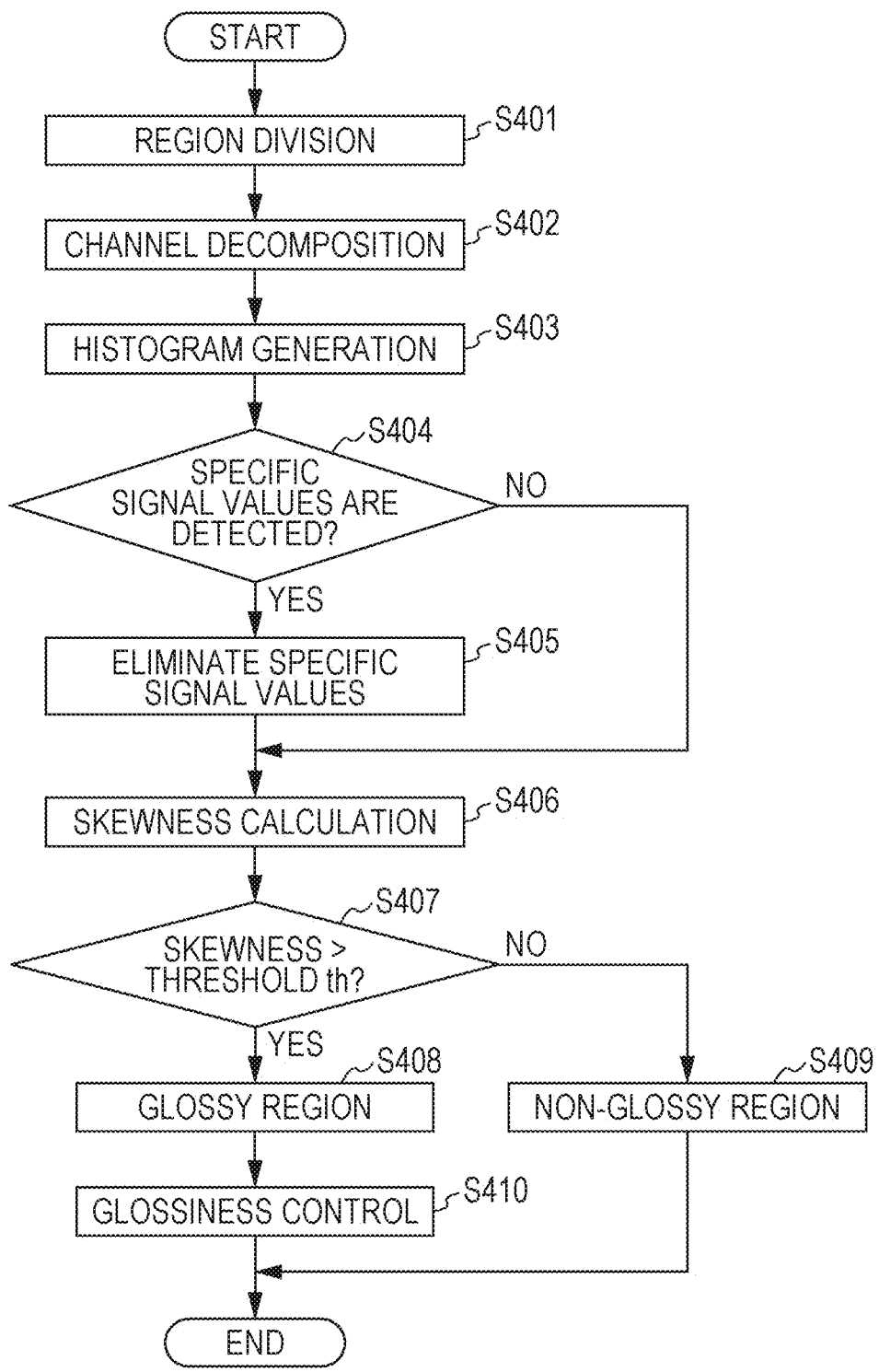
FIG. 4 is a flowchart according to the first embodiment.
Figure 5A:
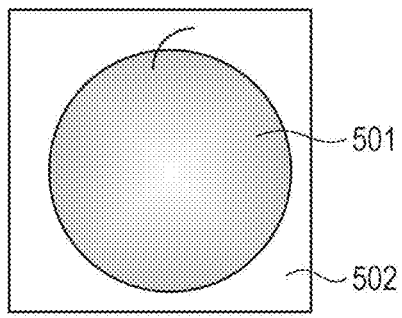
FIGS. 5A to 5D illustrate examples of input image data according to the first embodiment.

FIG. 4 is a flowchart illustrating a process involving glossiness determination and glossiness control in the data processing unit 215. A program that implements the flowchart is stored in the ROM 210 or the storage unit 211 in FIG. 2 and is executed by the CPU 205. The CPU 205 can transmit and receive data to and from the data processing unit 215 through the image bus I/F 212, the system bus 216, and the image bus 217. The following description will be made with reference to FIGS. 5A to 10C as appropriate. FIG. 5A illustrates an example of input image data in the first embodiment. An image 501 represents an orange (fruit). The image 501 is orange in color and represents a glossy surface. A background image 502 is white in color.

Figure 5B:
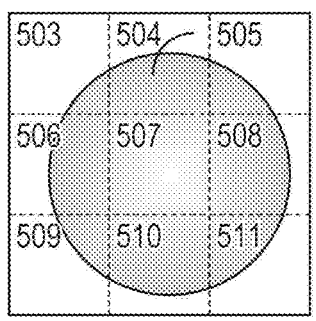
Figure 5C:
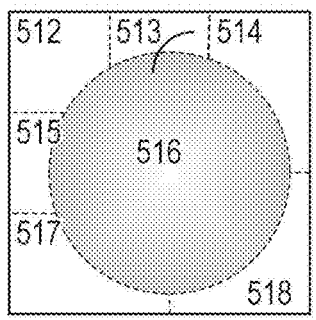

In step S401, the region division unit 301 divides the input image data into rectangular unit regions or regions having arbitrary shapes. FIG. 5B illustrates an example of the input image data of FIG. 5A divided into rectangular unit regions. As illustrated in FIG. 5B, the input image data is divided into rectangular unit regions 503 to 511. For example, the region 507 corresponds to part of the orange (fruit) image, whereas the region 510 includes part of the orange (fruit) image and part of the background image. As regards a method of dividing input image data into regions having arbitrary shapes, a known method may be used. For example, parts having similar colors may be combined and the combined parts may be set to one region. FIG. 5C illustrates an example of the input image data of FIG. 5A divided into regions having arbitrary shapes. Since the input image data is divided into regions 512 to 518 having arbitrary shapes as illustrated in FIG. 5C, for example, an image region representing the orange (fruit) can be separated from regions representing the background image. This method of division involves a higher processing load than that in the method of division into rectangular unit regions and may reduce processing accuracy. The first embodiment uses the method of dividing the input image data into rectangular unit regions. The rectangular unit regions may have any dimensions.

Figure 5D:
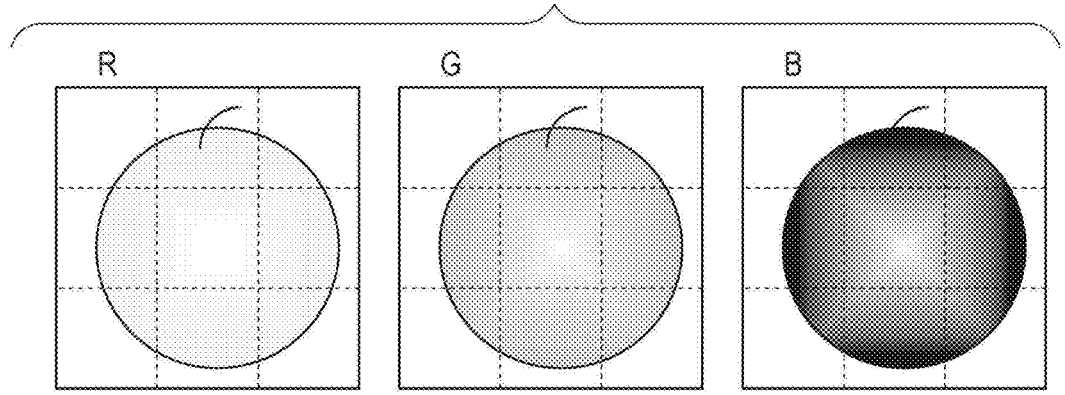

In step S402, the channel decomposition unit 302 performs channel decomposition on each of the regions obtained by dividing the color image data through the region division unit 301. FIG. 5D illustrates three color components, or R, G, and B components obtained by decomposing the image data of FIG. 5B. In actual processing, it is unnecessary to generate image data of the R, G, and B components as illustrated in FIG. 5D. It is only necessary to refer to signal values of the R, G, and B components in each of the rectangular unit regions of the image data of FIG. 5B.

Figure 6:
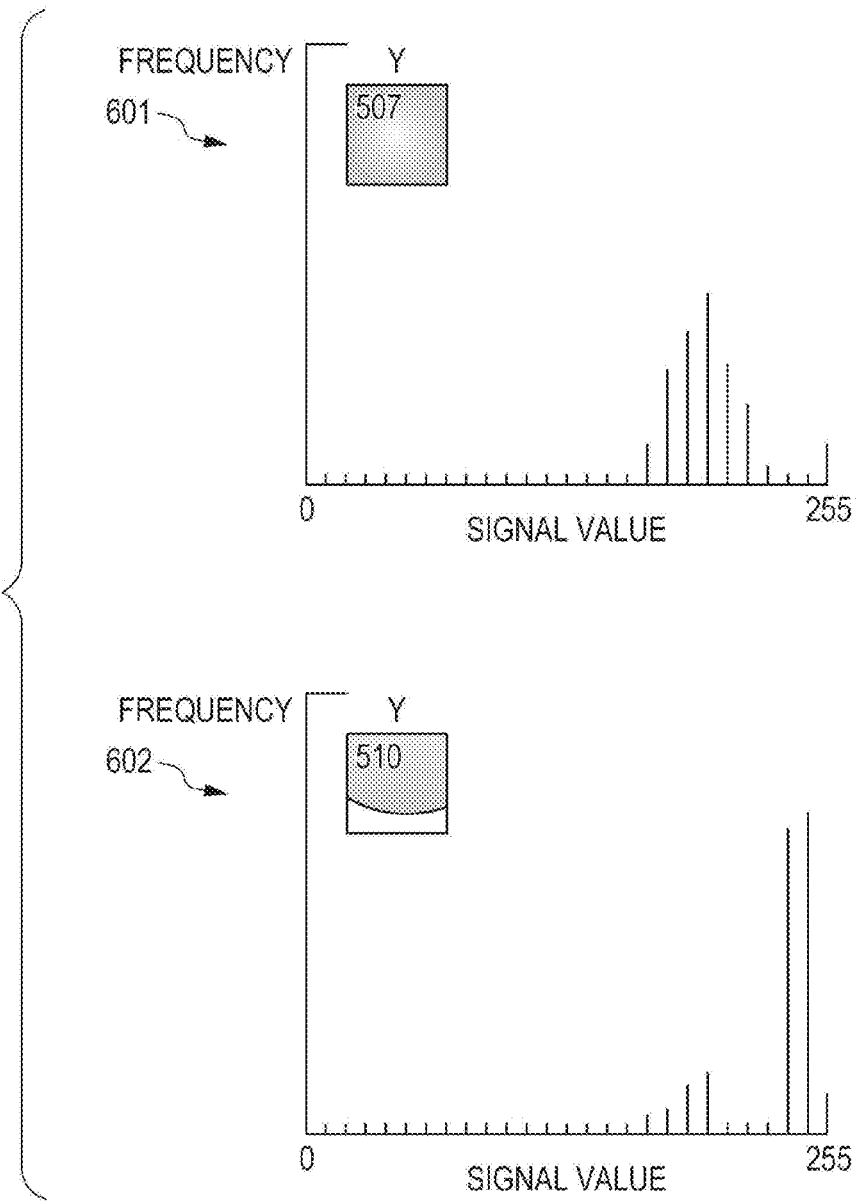
FIG. 6 illustrates luminance histograms according to the first embodiment.
Figure 7:
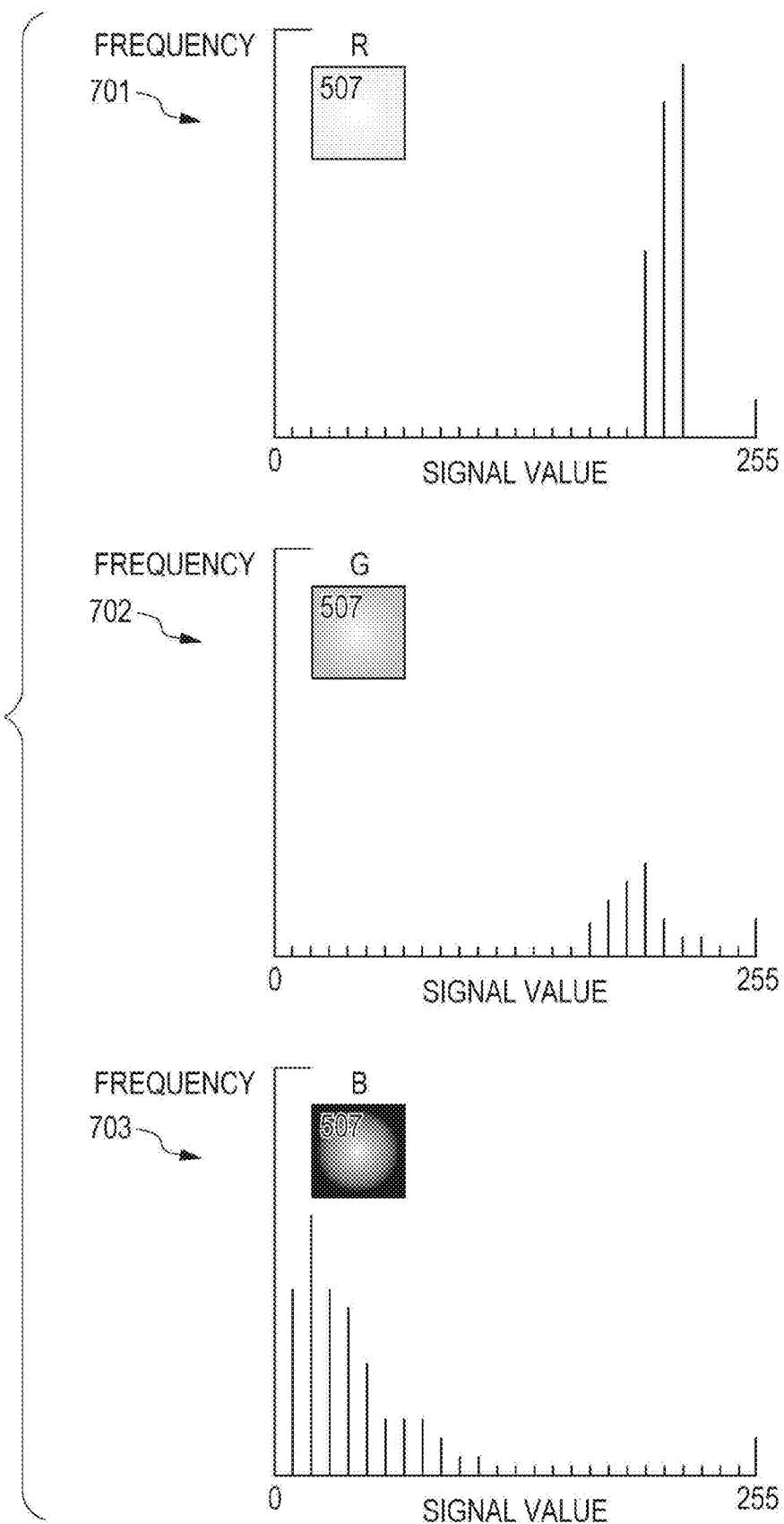
FIG. 7 illustrates R, G, and B histograms according to the first embodiment.

In step S403, the histogram generation unit 303 generates a histogram for each of the channels obtained by decomposition through the channel decomposition unit 302. Specifically, the histogram is generated based on the signal values of each of the R, G, and B components in FIG. 5D. FIG. 7 illustrates R, G, and B histograms corresponding to the region 507 in FIG. 5B. FIG. 7 illustrates a histogram 701 generated based on signal values of the R component, a histogram 702 generated based on signal values of the G component, and a histogram 703 generated based on signal values of the B component. In FIG. 7, the horizontal axis represents an 8-bit image signal value ranging from 0 (dark) to 255 (bright) and the vertical axis represents the frequency of appearance of the image signal value. Most of the region 507 is orange in color. In the histogram 703 generated based on the signal values of the B component, the frequencies of low signal values are high. As can be seen in FIG. 7, the histogram 703 is positively skewed. For comparison, FIG. 6 illustrates a histogram 601 of the luminance Y of the region 507 in FIG. 5B. As illustrated in the histogram 601 of the luminance Y, the frequencies of high signal values are high. The histogram is negatively skewed.

FIG. 10A illustrates a skewness calculated from the histogram 601 of the luminance Y in FIG. 6 and a skewness calculated for each of the channels, that is, skewnesses calculated from the histograms 701 to 703 based on the signal values of the R, G, and B components in FIG. 7. FIG. 10A demonstrates that the skewness of the luminance Y has a negative value, the skewnesses of the channels R and G have a negative value, and the skewness of the channel B has a positive value.

In other words, the skewness of the luminance Y of a color image that seems to be actually glossy (mainly glossy yellow or orange in color) may have a negative value. In such a case, the color image that seems to be actually glossy may fail to be properly determined to be glossy, resulting in an incorrect determination.

For the skewness calculated for each of the channels, the skewness of the B component has a positive value. An image having this skewness can be determined to be glossy. Since the skewness is obtained with high accuracy, the result of a glossiness determination can be obtained with high accuracy.

In step S404, the specific-signal-value detection and elimination unit 304 determines whether the input image data has a specific signal value in the histograms generated by the histogram generation unit 303.

The term "specific signal value" as used herein refers to a signal value representing, for example, the background image 502 in FIG. 5A. For glossiness determination in an image processing apparatus, such as an MFP or a printer, input image data may be divided into rectangular unit regions or regions having arbitrary shapes in the above-described manner and glossiness determination may be performed on each of the regions. If a region obtained by division includes a background image in addition to a glossy image, a distribution of signal values representing the background image would appear in addition to a distribution of signal values representing the glossy image in a generated histogram. It would be difficult to obtain a highly accurate skewness of the histogram. To obtain a highly accurate skewness of the histogram, signal values representing the background image can be eliminated and, after that, the skewness of the histogram can be calculated.

Figure 8:
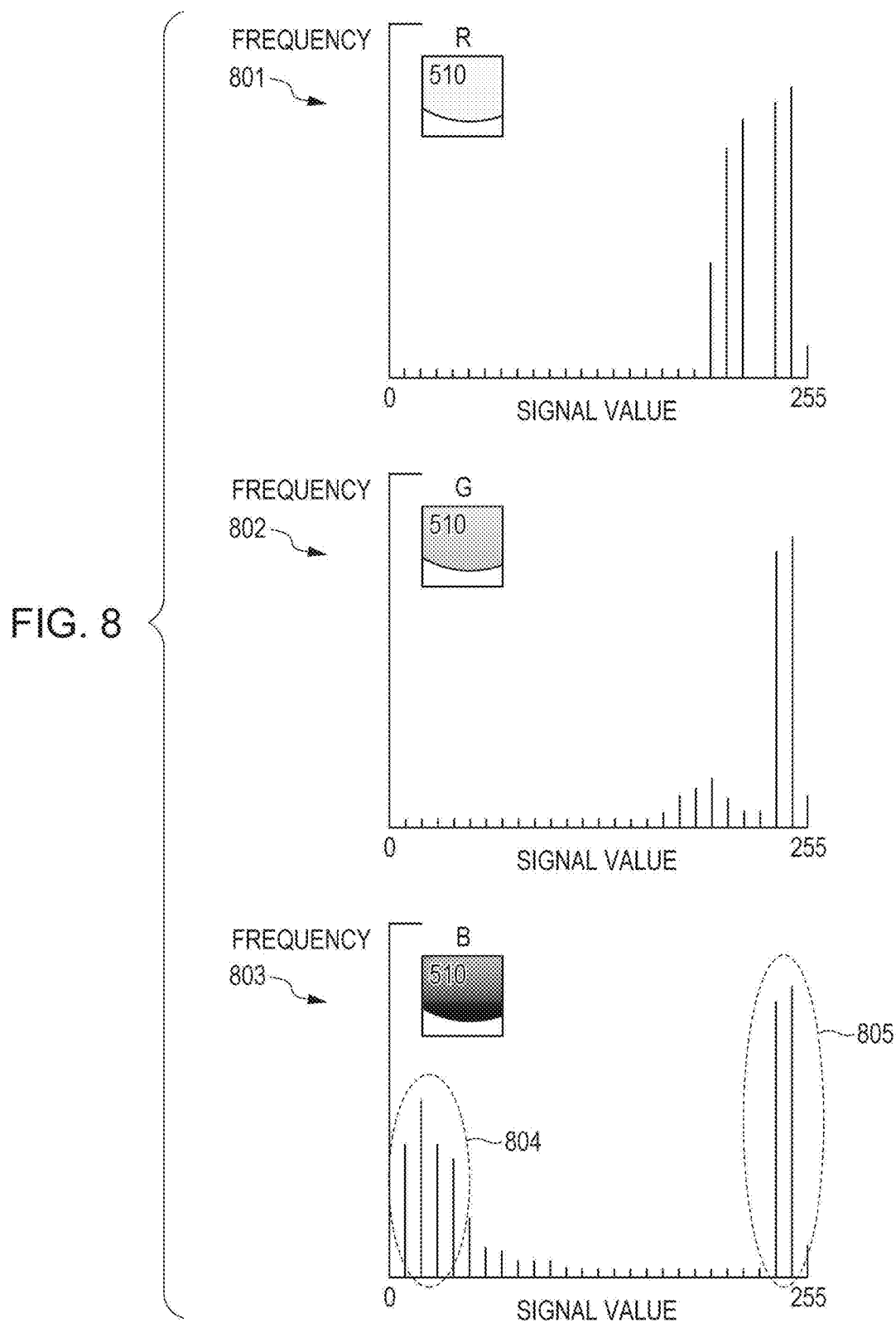
FIG. 8 illustrates R, G, and B histograms according to the first embodiment.

The region 510 in FIG. 5B will now be described as an example of a region, obtained by division, including the background image in addition to the glossy image. FIG. 8 illustrates R, G, and B histograms corresponding to the region 510.

FIG. 8 illustrates a histogram 801 generated based on signal values of the R component, a histogram 802 generated based on signal values of the G component, and a histogram 803 generated based on signal values of the B component. Since the region 510 includes the part of the orange (fruit) image and the part of the background image, the histogram 803 has two peaks, that is, a peak 804 and a peak 805. The peak 804 mainly corresponds to signal values representing the orange (fruit) image and the peak 805 corresponds to signal values representing the background image. As described above, the histogram includes a distribution of signal values representing the background image in addition to that of signal values representing the glossy image.

Figure 13:
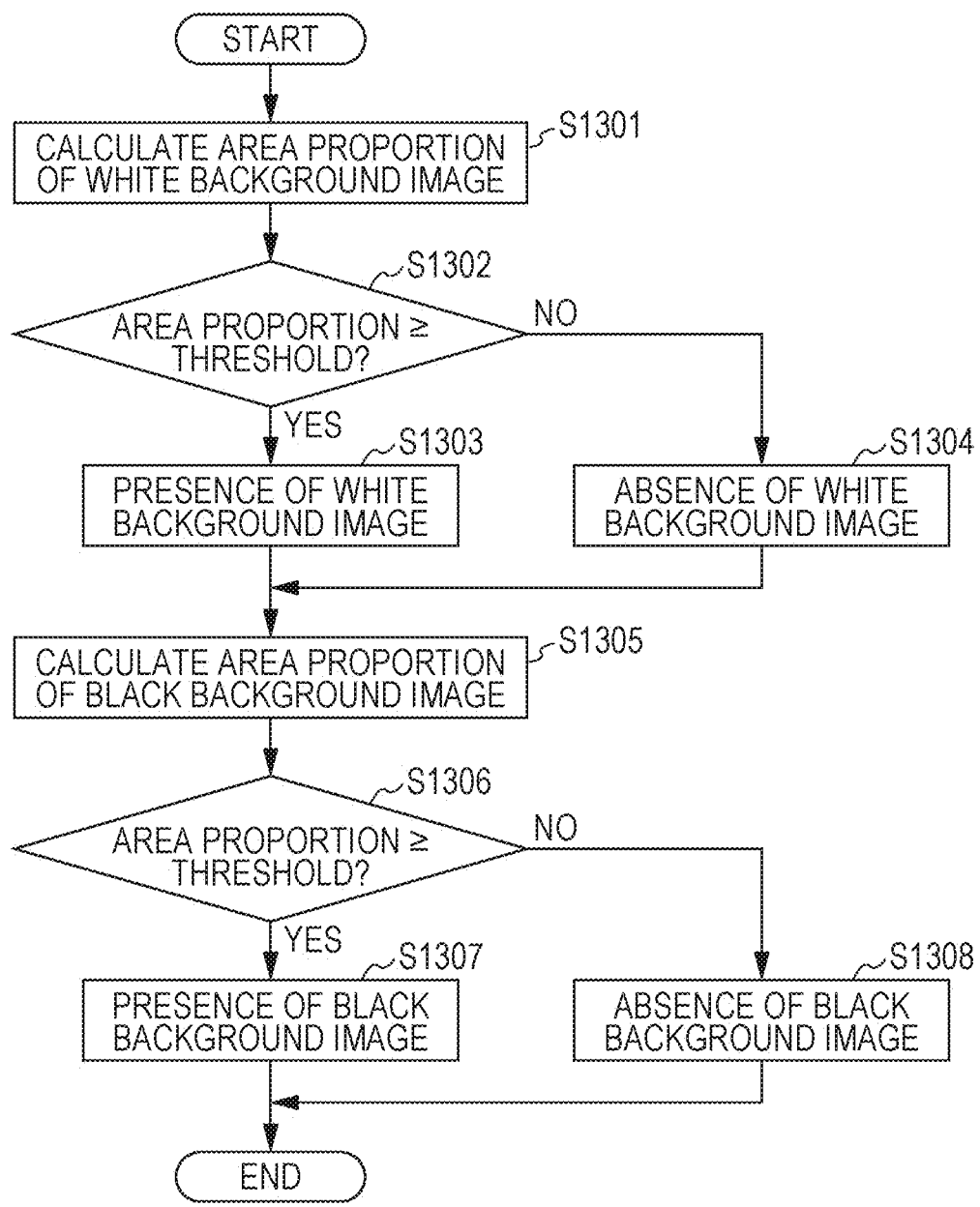
FIG. 13 is a flowchart of a process of detecting a specific signal value according to the first embodiment.

A specific example of a process of detecting a white background image and a black background image as specific signal values will now be described with reference to a flowchart of FIG. 13.

In step S1301, the specific-signal-value detection and elimination unit 304 calculates the proportion (hereinafter, also referred to as the "area proportion") of the area of the white background image to the area of a target region. Specifically, the specific-signal-value detection and elimination unit 304 calculates the proportion of the area corresponding to pixels having an 8-bit image signal value greater than or equal to, for example, 250 to the area of the target region.

In step S1302, the specific-signal-value detection and elimination unit 304 determines whether the area proportion calculated in step S1301 is greater than or equal to a predetermined threshold. For example, the threshold is set to 30%.

If the area proportion is greater than or equal to the predetermined threshold, the region is determined to include a white background image in step S1303. If the area proportion is less than the predetermined threshold, the region is determined not to include a white background image in step S1304.

In step S1305, the specific-signal-value detection and elimination unit 304 calculates the area proportion of a black background image. Specifically, the specific-signal-value detection and elimination unit 304 calculates the proportion of the area corresponding to pixels having an 8-bit image signal value less than or equal to, for example, 5 to the area of the target region.

In step S1306, the specific-signal-value detection and elimination unit 304 determines whether the area proportion calculated in step S1305 is greater than or equal to a predetermined threshold. For example, the threshold is similarly set to 30%.

If the area proportion is greater than or equal to the predetermined threshold, the region is determined to include a black background image in step S1307. If the area proportion is less than the predetermined threshold, the region is determined not to include a black background image in step S1308. As described above, a white background image and a black background image are detected as specific signal values.

Figure 9:
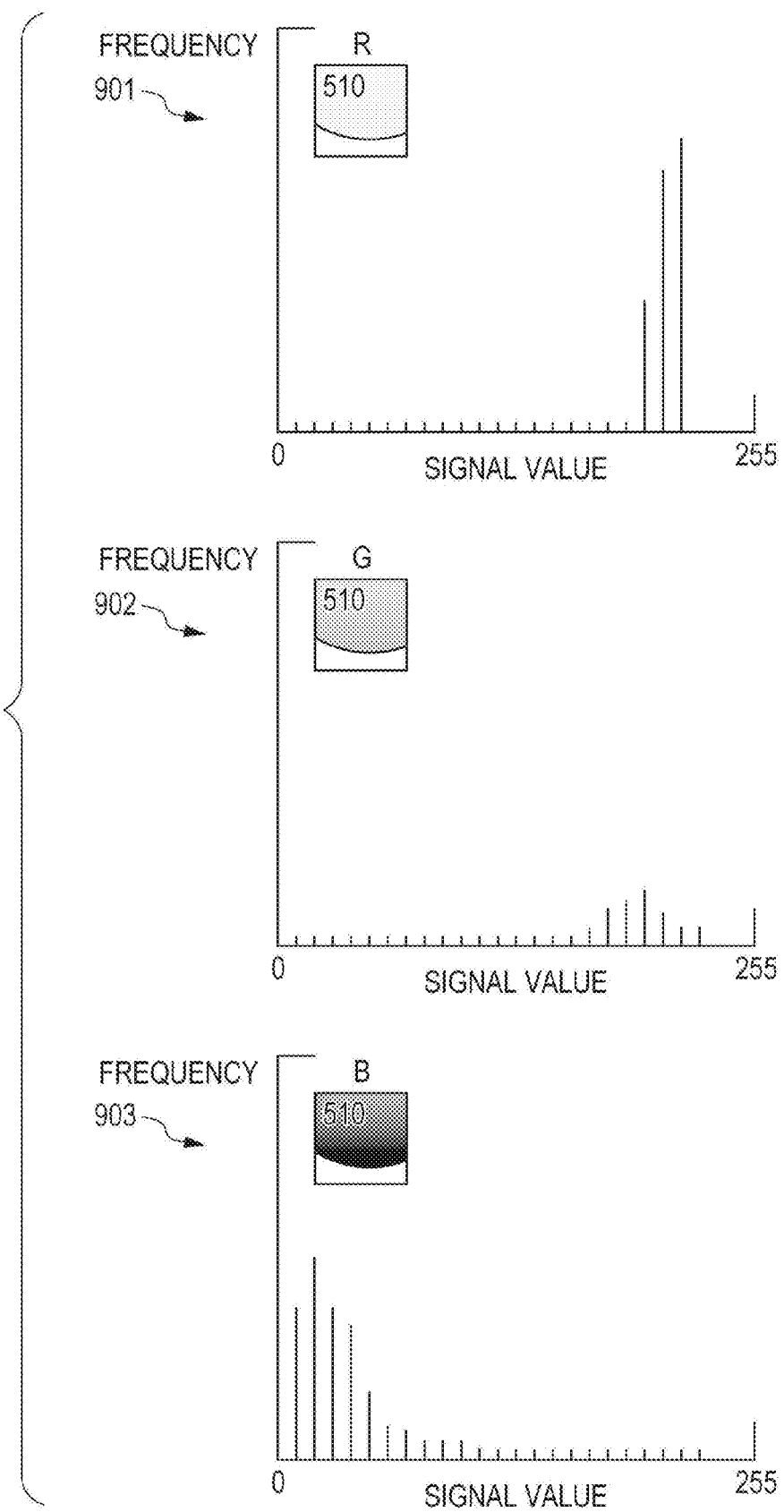
FIG. 9 illustrates R, G, and B histograms according to the first embodiment.

FIG. 9 illustrates histograms 901 to 903 obtained by eliminating the specific signal values from the histograms 801 to 803 of FIG. 8. For comparison, FIGS. 10B and 10C illustrate skewnesses of the histograms in FIGS. 8 and 9. Attention will be paid to the skewnesses of the B component. As can be seen from FIGS. 10B and 10C, the skewness of the B component in FIG. 10B has a negative value, whereas the skewness of the B component in FIG. 10C has a positive value. In other words, eliminating specific signal values, such as signal values representing a background image, from a histogram can obtain a highly accurate skewness.

Any other process of detecting a specific signal value can be used. For example, signal values of a glossy image are characterized by having a peak like a gentle mountain when represented in a histogram. In contrast, signal values of a background image are characterized by having a peak like a steep mountain when represented in a histogram. A steep peak can be detected by using these characteristics.

For example, the proportion of the area of pixels having signal values in a predetermined range (set to, for example, "3" for 8-bit image signal values) to the area of a target region of an image is calculated as follows.

First, the area proportion of pixels having signal values 0 to 2 is obtained. Then, the area proportion of pixels having signal values 1 to 3 is obtained. Then, the area proportion of pixels having signal values 2 to 4 is obtained.

Signal values are shifted one by one in this manner, the area proportion of pixels having signal values in each range is obtained, and the area proportion of pixels having signal values 253 to 255 is finally obtained. The area proportion exceeding a predetermined proportion may be detected as specific signal values. This process can detect a background image other than a white background image and a black background image. For example, assuming that an image is formed on a yellow background, yellow components corresponding to the background can be detected as specific signal values (a background image).

Referring again to the flowchart of FIG. 4, if specific signal values are detected in step S404, the process proceeds to step S405. If specific signal values are not detected in step S404, the process proceeds to step S406.

In step S405, the specific-signal-value detection and elimination unit 304 eliminates the above-described detected specific signal values, that is, the signal values representing the background image. Rather than performing image processing on the image data, the specific-signal-value detection and elimination unit 304 only eliminates the specific signal values in the histogram. The specific-signal-value detection and elimination unit 304 can perform such processing at high speed.

In step S406, the skewness calculation unit 305 calculates a skewness of each histogram generated in step S403. If specific signal values are detected in step S404, the skewness calculation unit 305 calculates a skewness of the histogram from which the specific signal values have been eliminated. Since the manner of calculating the skewness has been described above, the description is omitted to avoid redundancy.

In step S407, the glossiness determination unit 306 determines based on the skewnesses calculated by the skewness calculation unit 305 whether the target region is a glossy region or a non-glossy region.

If at least one of the skewnesses is a positive value, the region can be determined to be a glossy region. If at least one of the skewnesses is a negative value, the region can be determined to be a non-glossy region. A skewness threshold for glossiness determination may be changed depending on the state of the printer unit of the image processing apparatus or the type of sheet used.

If at least one of the skewnesses is greater than a predetermined threshold th, the region is determined to be a glossy region in step S408. If at least one of the skewnesses is less than or equal to the predetermined threshold th, the region is determined to be a non-glossy region in step S409.

In step S410, the glossiness control unit 307 controls the glossiness of the region determined to be a glossy region in step S408. Examples of glossiness control in MFPs and printers include density control and transparent toner addition control. Any other method that can provide a glossy appearance may be used.

As described above, each of the regions obtained by division in step S401 is determined to be a glossy region or a non-glossy region.

In some embodiments, the proportion of the glossy regions to the entire image may be calculated. If the proportion of the glossy regions exceeds a predetermined value, a message that prompts an operator operating an MFP or a printer to select plain paper or glossy paper may be displayed.

In some embodiments, if one of the regions is determined to be a glossy region, the message that prompts the operator operating the MFP or the printer to select plain paper or glossy paper may be displayed.

In some embodiments, glossiness control that can provide a glossy appearance may automatically be performed without any message being displayed.

As described above, obtaining the skewness of an input color image for each of at least two color components can increase the accuracy of glossiness determination for the input color image. If the glossiness of the image is determined based on the skewness of the luminance histogram, information about the B component of the image may be lost. This increases a likelihood of incorrect determination. In contrast, determining the glossiness of the image based on the skewness for each color component prevents loss of information about the B component of the image, reducing or eliminating the occurrence of incorrect determination. In addition, eliminating specific signal values, such as signal values representing a background image, can further increase the accuracy of glossiness determination.

Second Embodiment

In the first embodiment, the skewness is calculated for each of at least two color components of an input image to increase the accuracy of glossiness determination.

According to a second embodiment, a first determination is made based on a skewness calculated from a luminance histogram and a second determination is made based on skewnesses calculated from R, G, and B histograms. This reduces the need to calculate skewnesses of R, G, and B histograms for each region, thus increasing processing speed. This method will now be described.

Figure 12:
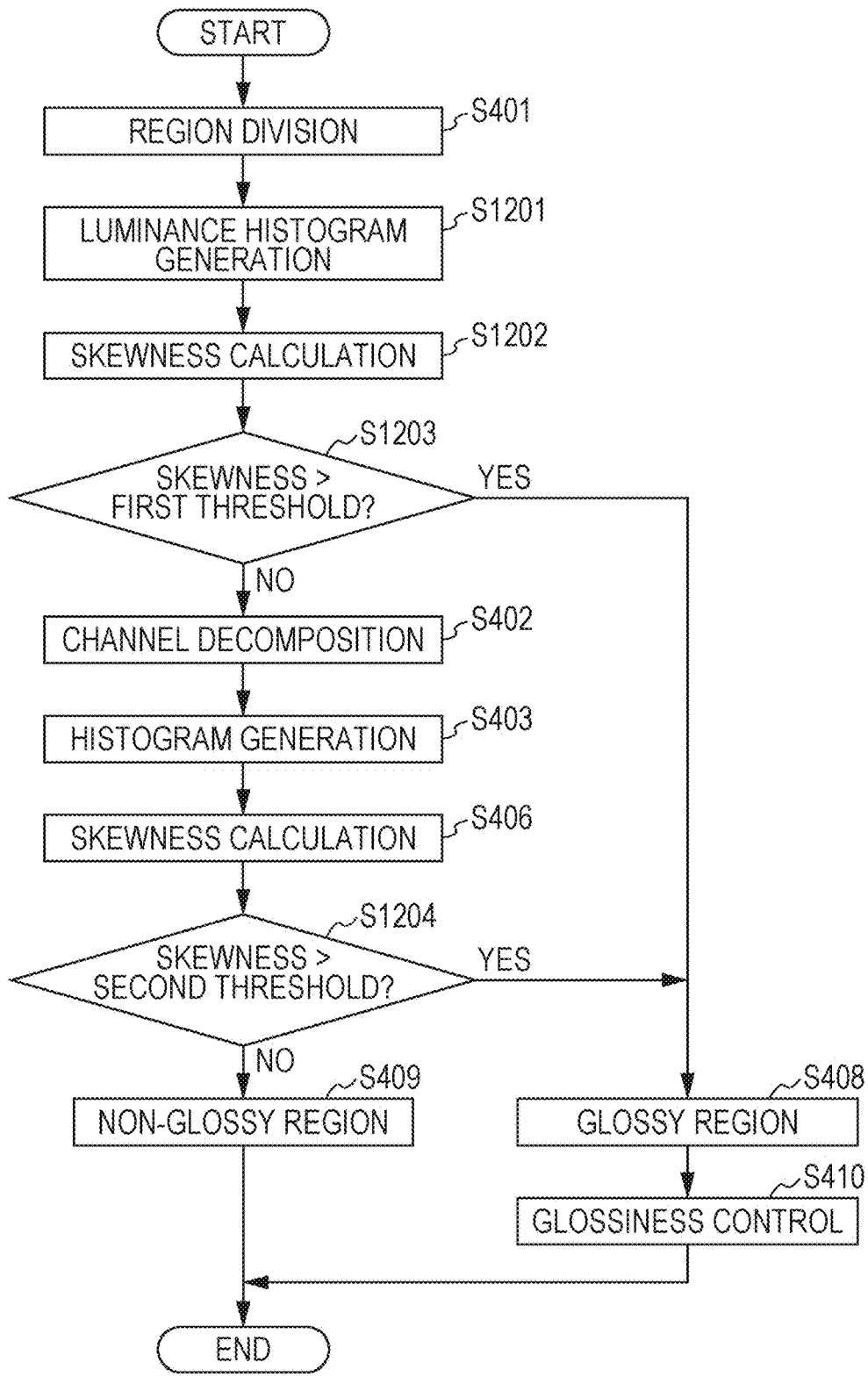
FIG. 12 is a flowchart according to a second embodiment.

FIG. 12 is a flowchart illustrating a process involving glossiness determination and glossiness control in the second embodiment.

A description of the same steps as those in FIG. 4 in the first embodiment is omitted.

In step S1201, the histogram generation unit 303 generates a luminance histogram for each of regions obtained by division of color image data in step S401.

In step S1202, the skewness calculation unit 305 calculates a skewness from the luminance histogram generated in step S1201. Since the manner of calculating the skewness has been described above, the description is omitted.

In step S1203, the glossiness determination unit 306 determines based on the skewness calculated in step S1202 whether a target region is a glossy region or a non-glossy region. If the skewness is greater than a first predetermined threshold, the process proceeds to step S408 and the region is determined to be a glossy region. If the skewness is less than or equal to the first predetermined threshold, the process proceeds to step S402.

In step S402, channel decomposition is performed. Since steps S402, S403, and S406 are the same as those in FIG. 4 in the first embodiment, a description of these steps is omitted.

In step S1204, the glossiness determination unit 306 determines based on skewnesses calculated in step S406 whether the target region is a glossy region or a non-glossy region. If at least one of the skewnesses is greater than a second predetermined threshold, the region is determined to be a glossy region in step S408. If at least one of the skewnesses is less than or equal to the second predetermined threshold, the region is determined to be a non-glossy region in step S409.

In step S410, the glossiness control unit 307 controls the glossiness of the region determined to be a glossy region in step S408. Since step S410 is the same as that in FIG. 4 in the first embodiment, a description of this step is omitted.

As described above, each of the regions obtained by division in step S401 is determined to be a glossy region or a non-glossy region.

As described above, the first determination is made based on a skewness calculated from a luminance histogram. If the skewness is less than or equal to the threshold, the second determination is made based on skewnesses calculated from R, G, and B histograms. In other words, a region determined to be a non-glossy region is subjected to glossiness determination based on the skewnesses obtained from the histograms of the R, G, and B components obtained by decomposition of the image.

This reduces the need to calculate skewnesses of the R, G, and B histograms for each region, thus increasing the processing speed.

Third Embodiment

In the first embodiment, as described above, a skewness is calculated for each of at least two color components of an input image to increase the accuracy of glossiness determination.

In the second embodiment, as described above, the first determination is performed based on a skewness calculated from a luminance histogram and the second determination is performed based on skewnesses calculated from R, G, and B histograms. This reduces the need to calculate a skewness of each of the R, G, and B histograms for each region, thus increasing the processing speed.

According to a third embodiment, a characteristic amount obtained based on frequency components of an image is used in addition to a skewness as a characteristic amount, thus further increasing the accuracy of glossiness determination. This method will now be described.

An example of an image that is difficult to determine to be glossy based on the above-described skewness as a characteristic amount will be described with reference to FIGS. 15A and 15B.

Figure 15A:
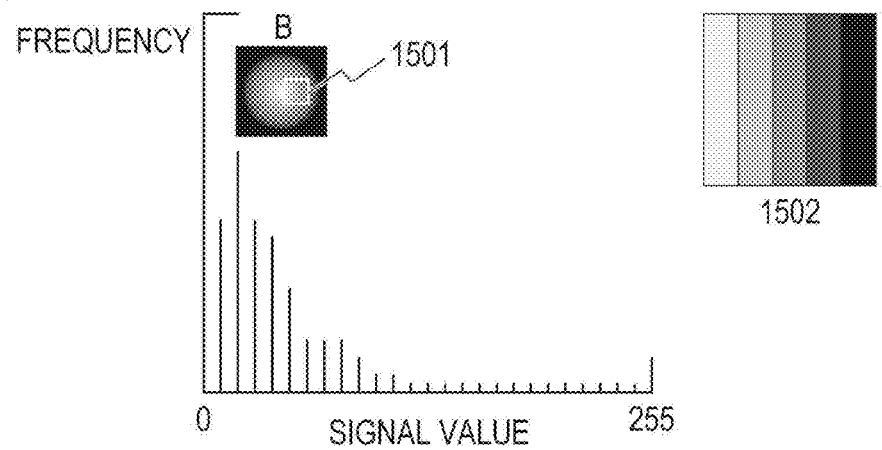
FIGS. 15A to 15C illustrate R, G, and B histograms according to the third embodiment.

FIG. 15A is a diagram similar to the histogram 703 in FIG. 7 in the first embodiment. FIG. 15A illustrates an exemplary glossy image 1501, a histogram obtained from this image, and an image 1502, which is an enlarged view (schematic diagram for brief explanation) of part of the image 1501.

Figure 15B:
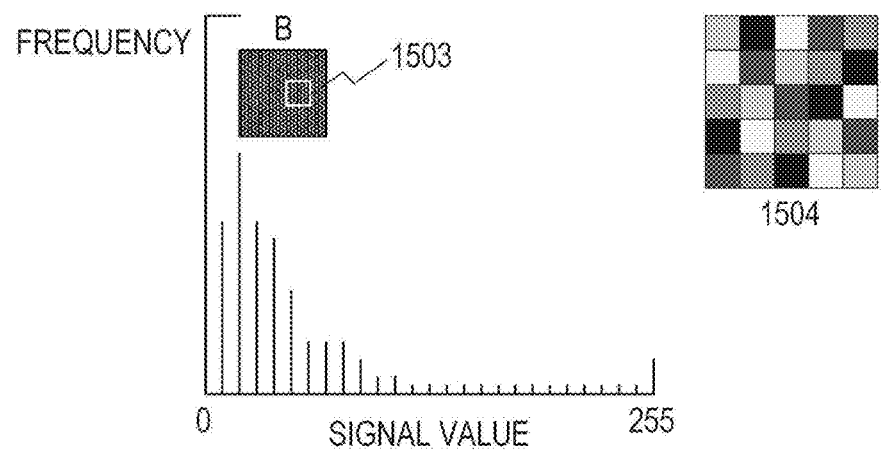

FIG. 15B illustrates an exemplary matt image (seems to be matt) 1503, a histogram obtained from this image, and an image 1504, which is an enlarged view (schematic diagram for brief explanation) of part of the image 1503.

When the histogram of the image 1503 in FIG. 15B is the same as that of the image 1501 in FIG. 15A, a skewness calculated from each of the histograms of the images in FIGS. 15A and 15B is 2.1 as described above with reference to FIG. 10A. In other words, the image 1503 in FIG. 15B has a positive skewness. Although the image 1503 is matt or seems to be matt, the image is determined to be glossy. As described above, some images may fail to be properly subjected to glossiness determination based on a skewness as a characteristic amount.

The image 1503 in FIG. 15B is characterized by having more high-frequency components (or less low-frequency components) than the image 1501 in FIG. 15A.

According to the third embodiment, a characteristic amount obtained based on frequency components of an image is used in addition to the skewness as a characteristic amount, and whether the image (or a target region of the image) is glossy is determined based on these characteristic amounts. This method will now be described with reference to a flowchart of FIG. 14.

Since steps S401 to S403, S406, and S407 are the same as those in FIG. 4 in the first embodiment, a description of these steps is omitted.

Steps S1401 to S1404 are to further determine, based on a characteristic amount obtained based on frequency components of an image determined to have a positive skewness (or a skewness greater than the threshold th), whether the image is a glossy region.

Each of the image 1501 in FIG. 15A and the image 1503 in FIG. 15B is determined to have a skewness greater than the threshold th.

In the third embodiment, a low-pass filter is used to obtain a characteristic amount based on frequency components of an image. In the alternative, any other method, for example, frequency conversion, such as discrete Fourier transform (DFT), may be used.

Figure 16:
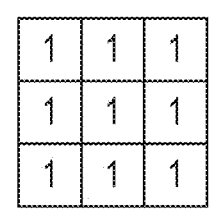

In step S1401, the glossiness determination unit 306 performs filtering with the low-pass filter (hereinafter, "low-pass filtering") on an image determined to have a skewness greater than the threshold th in step S407. FIG. 16 illustrates an exemplary 3×3 low-pass filter.

A change in image subjected to low-pass filtering will now be described with respect to the image 1501 in FIG. 15A and the image 1503 in FIG. 15B. Since the image 1501 in FIG. 15A has a smoothly varying gray scale, an image obtained by low-pass filtering the image 1501 and a histogram of the obtained image do not significantly change. If a histogram does not change significantly, its skewness will not change significantly. In contrast, the image 1503 in FIG. 15B has an abrupt change in density. An image obtained by low-pass filtering the image 1503 and a histogram of the obtained image tend to change. If a histogram changes, its skewness will also change.

Figure 15C:
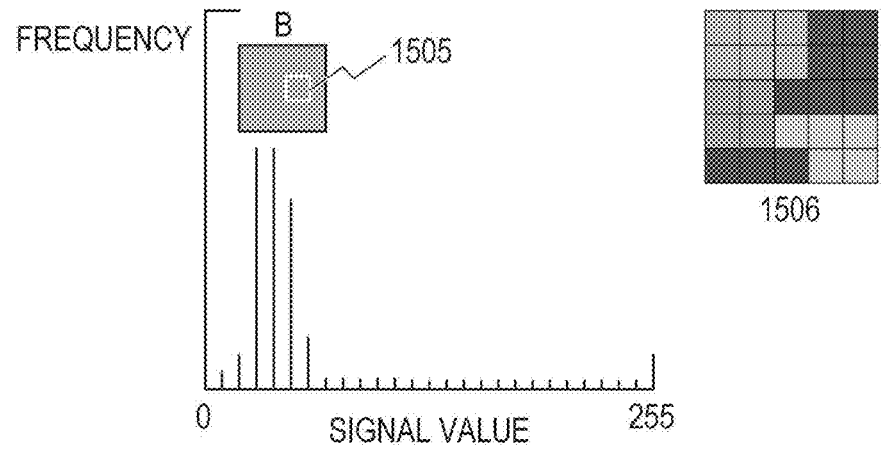

FIG. 15C illustrates an example of an image, indicated at 1505, obtained by low-pass filtering the image 1503 in FIG. 15B, a histogram of the obtained image, and an image 1506, which is an enlarged view (schematic diagram for brief explanation) of part of the image 1505. The image 1506 demonstrates that the low-pass filtering reduces the abrupt change in density, as compared to the image 1504. It is assumed that the skewness of the histogram in FIG. 15C is 1. Since the skewness of the histogram before the low-pass filtering is 2.1, the amount of change in skewness before and after the low-pass filtering is 1.1.

An image determined to have an amount of change in skewness before and after the low-pass filtering less than a threshold is determined to be a glossy region. In contrast, an image determined to have an amount of change in skewness before and after the low-pass filtering greater than or equal to the threshold is determined to be a non-glossy region. In other words, a large amount of change in skewness before and after the filtering means that a target image includes few low frequency components, revealing that the target image is a non-glossy region. In contrast, a small amount of change in skewness before and after the filtering means that a target image includes many low frequency components, revealing that the target image is a glossy region.

Referring again to the flowchart of FIG. 14, in step S1402, the glossiness determination unit 306 calculates a skewness of an image obtained by the low-pass filtering as described above. Since the manner of calculating the skewness has been described above, the description is omitted. In step S1403, the glossiness determination unit 306 calculates an amount of change based on the skewness, indicated by A, calculated in step S406 and the skewness, indicated by B, calculated in step S1402. In the third embodiment, the amount of change in skewness is the absolute value of the difference between the skewness A and the skewness B. Any value other than the difference, for example, a change rate, may be calculated and used.

In step S1404, the glossiness determination unit 306 determines whether the amount of change in skewness calculated in step S1403 is less than a predetermined threshold th2.

If the amount of change in skewness is less than the threshold th2, the target image is determined to be a glossy region in step S408. If the amount of change in skewness is greater than or equal to the threshold th2, the target image is determined to be a non-glossy region in step S409.

For example, it is assumed that the threshold th2 is 1. Since the amount of change in skewness associated with the image 1503 in FIG. 15B is 1.1 as described above, the image 1503 is determined to be a non-glossy region. Thus, an image that seems not to be glossy can be determined as a non-glossy region.

As described above, the use of the characteristic amount obtained based on frequency components of an image can increase the accuracy of glossiness determination.

In the flowchart of FIG. 14, only when the skewness is determined to be greater than the threshold th in step S407, a determination based on an amount of change in skewness is performed after the filtering. In some embodiments, a determination based on skewness and a determination based on an amount of change in skewness before and after the filtering may be performed simultaneously. In this case, an image determined to be glossy in each of these determination processes can be determined to be glossy.

Although the low-pass filtering is performed to use a characteristic amount based on frequency components of an image, any other method may be used. For example, frequency conversion, such as DFT, may be used.

In some embodiments, attention may be paid to an edge having high frequency component characteristics, known edge detection may be performed, and a region having an edge value greater than a threshold may be determined to be a non-glossy region.

As described above, an image that has not been properly subjected to glossiness determination based on a skewness, serving as a characteristic amount, can be subjected to glossiness determination based on a characteristic amount obtained based on frequency components of the image in addition to the skewness. Thus, the accuracy of glossiness determination can be increased.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-081486 filed Apr. 14, 2016 and Japanese Patent Application No. 2017-016097 filed Jan. 31, 2017, which are hereby incorporated by reference herein in their entirety.

What is claimed is:

1. An image processing apparatus comprising:
a controller which causes the image processing apparatus to:
decompose a color image into at least two color component images;
obtain skewnesses of histograms corresponding to the at least two color component images; and
determine, based on the obtained skewnesses of the histograms corresponding to the at least two color component images, whether the color image is glossy,
wherein, in a case where at least one of the obtained skewnesses of the histograms corresponding to the at least two color component images is greater than a predetermined threshold, it is determined that the color image is glossy.

2. The image processing apparatus according to claim 1, wherein the controller further causes the image processing apparatus to:
eliminate a specific signal value detected from each of the histograms corresponding to the color component images.

3. The image processing apparatus according to claim 2, wherein the specific signal value is a signal value obtained from a background image included in the color image.

4. The image processing apparatus according to claim 2, wherein the controller further causes the image processing apparatus to obtain skewnesses of histograms obtained by eliminating the specific signal value from the histograms.

5. The image processing apparatus according to claim 1, wherein the controller further causes the image processing apparatus to:
divide the color image into regions having any shape,
wherein the controller causes the image processing apparatus to determine, for each of the regions, based on the skewnesses for the region, whether the region is glossy, and
wherein the controller causes the image processing apparatus to determine the color image to be glossy when the regions determined to be glossy have an area greater than or equal to a predetermined threshold.

6. The image processing apparatus according to claim 1, wherein the controller further causes the image processing apparatus to:
obtain another skewness of a luminance histogram corresponding to the color image,
wherein, in a case where it is determined based on the obtained another skewness that the color image is not glossy, it is determined based on the skewnesses of the histograms corresponding to the obtained color component images whether the color image is glossy.

7. The image processing apparatus according to claim 1, wherein the controller further causes the image processing apparatus to decompose the color image into R, G, and B components.

8. The image processing apparatus according to claim 1, wherein the histogram represents a frequency distribution indicating a frequency of appearance of each pixel of the color image plotted against a signal value of the pixel.

9. The image processing apparatus according to claim 1, wherein the skewness of the histogram represents an extent to which the histogram is skewed.

10. The image processing apparatus according to claim 1, wherein the controller further causes the image processing apparatus to:
obtain a characteristic amount based on frequency components of the color image,
wherein the controller causes the image processing apparatus to determine, based on the obtained skewnesses associated with the color component images and the obtained characteristic amount, whether the color image is glossy.

11. The image processing apparatus according to claim 10, wherein the controller further causes the image processing apparatus to obtain a third skewness from an image obtained by filtering each of the color component images, a difference between the obtained skewness and the third skewness is used as a characteristic amount, and it is determined that the color image not to be glossy when the characteristic amount is less than a threshold.

12. The image processing apparatus according to claim 1, wherein the controller further causes the image processing apparatus to:
obtain a characteristic amount based on frequency components of the color image,
wherein the controller causes the image processing apparatus to determine, based on the obtained characteristic amount, whether the color image determined to be glossy based on the obtained skewnesses is glossy.

13. An image processing method comprising:
decomposing a color image into at least two color component images;
obtaining a-skewness of a histogram corresponding to the at least two color component images; and
determining based on the obtained skewnesses of the histograms corresponding to the at least two color component images whether the color image is glossy,
wherein, in a case where at least one of the obtained skewnesses of the histograms corresponding to the at least two color component images is greater than a predetermined threshold, it is determined that the color image is glossy.

14. A non-transitory computer readable storage medium storing a program for causing a computer to execute an image processing method, the image processing method comprising:
decomposing a color image into at least two color component images;

obtaining a skewness of a histogram corresponding to the at least two color component images; and determining based the obtained skewnesses of the histograms corresponding to the at least two color component images whether the color image is glossy, wherein, in a case where at least one of the obtained skewnesses of the histograms corresponding to the at least two color component images is greater than a predetermined threshold, it is determined that the color image is glossy.

* * * * *